United States Patent [19]

Pinto et al.

[11] 4,154,545

[45] May 15, 1979

[54] EXTERNALLY MOUNTED MULTIPLE CAM ACTION LOCK FOR TELESCOPING TUBES

[75] Inventors: Joseph G. Pinto, Salisbury; George Yazvac, Jr., Crisfield, both of Md.

[73] Assignee: The Sherwin-Williams Company, Cleveland, Ohio

[21] Appl. No.: 926,605

[22] Filed: Jul. 21, 1978

[51] Int. Cl.² .............................................. F16B 7/14
[52] U.S. Cl. ................................... 403/104; 403/109; 403/341; 403/350; 24/136 R
[58] Field of Search ............... 403/109, 104, 301, 302, 403/350, 351, 341, 342, 343, 320, 313, 314, 374, 305, DIG. 7; 16/115; 24/81 PE, 136 R; 248/157, 159, 327, 287, 295 R, 353, 354 R, 355; 285/323

[56] References Cited

U.S. PATENT DOCUMENTS

| | | | |
|---|---|---|---|
| 1,064,663 | 6/1913 | Maynard | 403/351 |
| 3,051,514 | 8/1962 | Consolloy | 403/350 X |
| 3,261,070 | 7/1966 | Abolins | 24/81 PE UX |
| 3,667,788 | 6/1972 | Greenwood | 403/104 |

Primary Examiner—Wayne L. Shedd
Attorney, Agent, or Firm—James V. Tura

[57] ABSTRACT

The invention comprises an externally mounted locking mechanism for telescoping tubes that permits releasable adjustment of the tubes to any telescoping position relative to each other and utilizes multiple cam action locking means operating both longitudinally and circumferentially relative to the tubes. Two preferred embodiments are disclosed, a two-piece structure and a three-piece structure, both of which are preferably molded from a plastic material.

10 Claims, 7 Drawing Figures

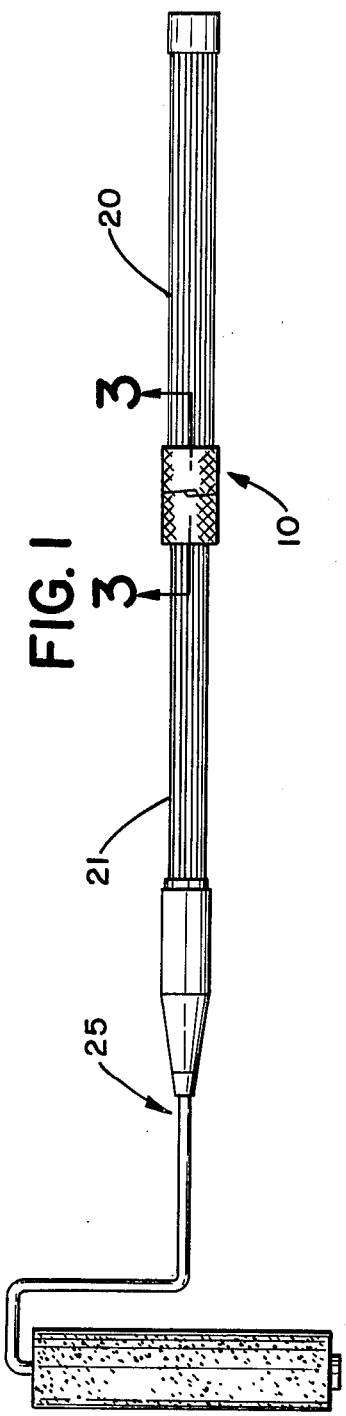
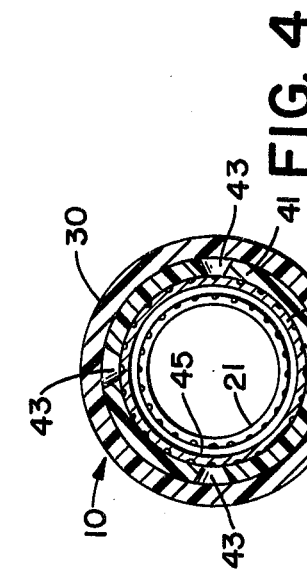
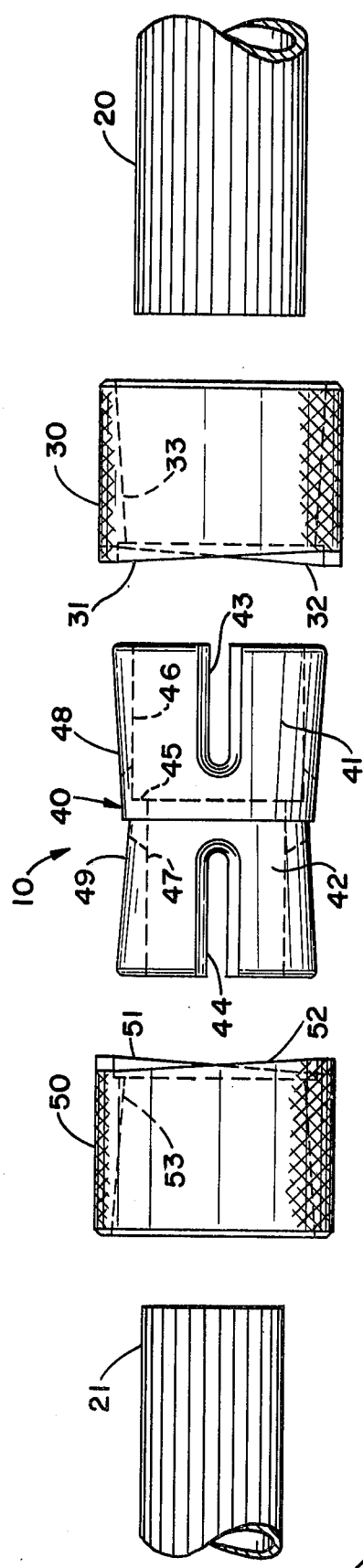
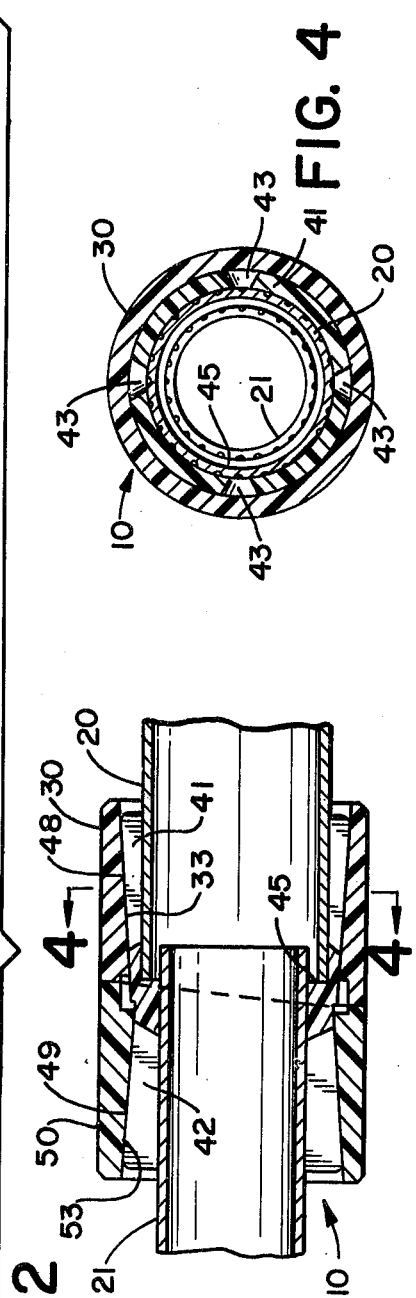

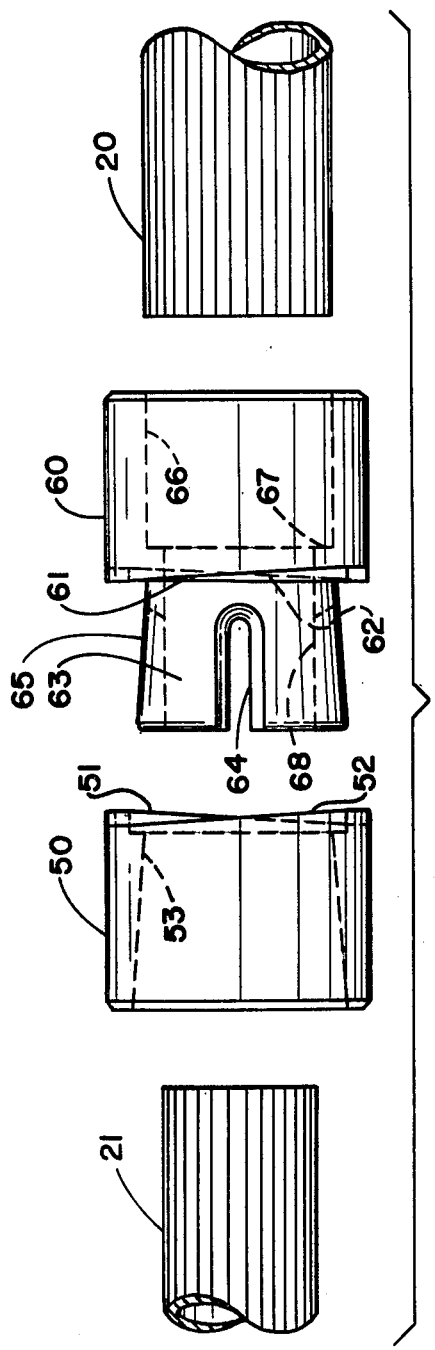
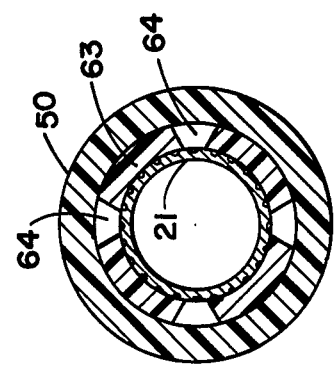
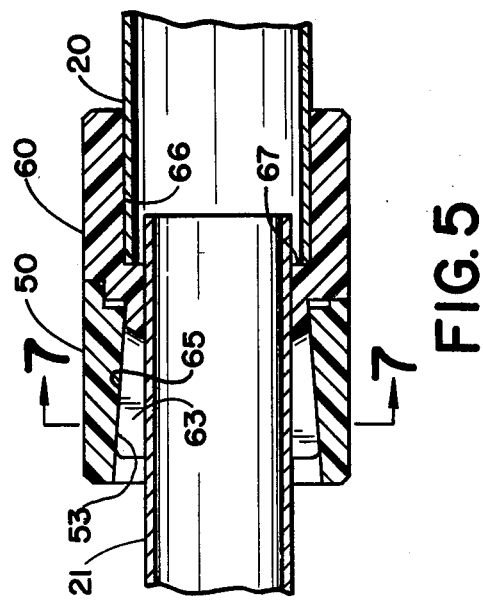

EXTERNALLY MOUNTED MULTIPLE CAM ACTION LOCK FOR TELESCOPING TUBES

BACKGROUND OF THE INVENTION

1. Field of the Invention

The field of the invention embraces cam action locking mechanisms for telescoping tubes. Related devices have been employed particularly with extension poles for paint applicators.

2. Description of the Prior Art

The most pertinent prior art known to the inventor are the patents to Burton et al, U.S. Pat. No. 3,596,946, and Pharris, U.S. Pat. No. 3,380,097.

Burton et al disclosed a cam lock disposed in the interior of telescoping tubes. The use of this device is limited or prohibited in applications where it is desirable to utilize the interior of the tubes as, for example, with internally fed paint applicators. This device also has the limitation that in order to tighten or release the tubes it is necessary to rotate the tubes themselves relative to one another as opposed to merely rotating parts of the locking mechanism. With some applications, particularly painting, this limitation can lead to mess and confusion.

Pharris disclosed a threaded locking mechanism that is complex in construction, and cumbersome and difficult to operate. For example, this device requires as much as a full turn and considerable tightening pressure to lock the telescoping tubes relative to one another. On the other hand, the camming action of the present invention by use of greater leverage inherent in its multiple cam construction permits the tightening of the tubes with significantly less pressure exertion and only about a half of a turn or less of the collars.

Other cam locking mechanisms for telescoping tubes have been disclosed in the prior art. However, nothing therein suggests the construction of the present invention or its advantages.

SUMMARY OF THE INVENTION

The invention comprises a locking mechanism for telescoping tubes that is mounted externally on the tubes and permits the tubes to be releasably adjusted to any telescoping position. Two embodiments are disclosed, one a three-piece structure and the other a two-piece structure, both of which are molded from a plastic material. The mechanism is disclosed as being used with an extension pole for a paint applicator, but can be used for other applications requiring releasably adjustable telescoping tubes.

The three-piece structured embodiment comprises a sleeve that includes a pair oppositely facing compressible plug portions and two collars that fit over said plug portions. The mechanism is tightened or loosened by rotating the collars in opposite directions relative to each other. Disposed on the radial inner edges of each of the collars are camming surfaces that interface with each other and that slide against each other when the collars are rotated. The interaction of these camming surfaces causes the collars to move axially outward from each other when the collars are rotated in a tightening fashion, and to move axially toward each other when the collars are rotated in a loosening fashion. The outer surfaces of the compressible plug portions are flared and form longitudinal camming surfaces which interact with the internal bores of the collars that are flared in a similar and cooperating manner. When the collars are rotated so as to move axially outward from each other, the interaction of the longitudinal camming surfaces causes the compressible plug portions to flex and exert a compressive pressure on the tubes. Similarly, when the collars are rotated so as to move axially toward each other the interaction of the longitudinal camming surfaces releases the compressive pressure so exerted on the tubes.

In the two-piece structured embodiment the sleeve and one of the collars are molded intricately into one piece which is fixedly mountable to an end of the outer telescoping tube. The sleeve includes a compressible plug portion which a second collar fits over. Disposed on the inner radial edges of the collars, and on the outer surface of the compressible plug portion and the inner bore of the collar that fits over the plug portion are camming surfaces similar to those in the three-piece embodiment which interact to tighten or loosen the locking mechanism when the collars are rotated relative to each other.

With either embodiment the tubes can be releasably adjusted to any telescoping position by less than one-half, and generally only about one-third of a turn of the collars. A novel feature of the invention is the combination of camming surfaces described above employed with a locking mechanism for use with telescoping tubes, the mechanism being mounted on the outer surfaces of the tubes. Objects of the invention are to provide a locking mechanism for telescoping tubes that solves the problems that have plagued the prior art and that is simple and economical in construction, reliable in use and easy to operate. Other objects will appear from the description of the preferred embodiments.

BRIEF DESCRIPTION OF THE DRAWINGS

FIG. 1 is a side elevation illustrating a pair of telescoping tubes being used as an extension pole for a conventional paint roller and utilizing a preferred embodiment of the multiple cam action locking mechanism comprising the invention to retain the poles in locked adjusted position relative to each other.

FIG. 2 is an enlarged exploded side elevation illustrating the various parts of the locking mechanism depicted in FIG. 1.

FIG. 3 is an enlarged section of the multiple cam action lock depicted in FIGS. 1 and 2 taken along line 3—3 in FIG. 1.

FIG. 4 is an enlarged transverse section of the multiple cam action lock depicted in FIGS. 1 to 3 taken along line 4—4 in FIG. 3.

FIG. 5 is an enlarged section of a multiple cam action lock comprising an alternate preferred embodiment of the invention.

FIG. 6 is an enlarged exploded side elevation illustrating the various parts of the alternate preferred embodiment of the invention depicted in FIG. 5.

FIG. 7 is an enlarged transverse section of the alternate preferred embodiment of the invention depicted in FIGS. 5 and 6 taken along line 7—7 in FIG. 5.

DESCRIPTION OF THE PREFERRED EMBODIMENTS

A preferred embodiment of the invention, FIGS. 1-4 inclusive, comprises the externally mounted, multiple cam action locking mechanism 10 for telescoping tubes 20 and 21. The telescoping tubes are illustrated as being used as an extension pole for paint roller 25 but it is to be understood that the invention can also be used with telescoping tubes employed for other purposes.

The locking mechanism 10 is preferably constructed of a plastic material such as polypropylene, polyvinyl chloride, acrylonitrile-butadiene-styrene, nylon or any other material having similar qualities of flexibility, resiliency, durability and moldability. The molding characteristics of the material are particularly significant in view of the fact that reasonable tolerances must be maintained in the manufacture of the cammed surfaces of the invention in order to maintain proper operation of the device.

The preferred embodiment depicted in FIGS. 1 to 4 comprises three separate parts, collars 30 and 50, and sleeve 40. Compressible plug portion 41 of sleeve 40 preferably is press fitted over the end of outer telescoping tube 20. The press fit is used to secure locking mechanism 10 on tube 20 during the movement or manipulation of tube 21, the intent being that locking mechanism 10 not accidentally fall off tube 20 or slide along tube 21 during the manipulation or movement of tube 21. A clearance fit is provided between tube 21 and the internal bore 47 of compressible plug portion 42 to permit tube 21 to slide freely into and out of sleeve 40 and tube 20 when collar 50 and compressible plug portion 42 are not tightened, as discussed below, so as to restrict the movement of tube 21.

Compressible plug portions 41 and 42 each contain a plurality of slots 43 and 44, respectively, to permit said plug portions to flex and exert compressive pressure on tubes 20 and 21 when collars 30 and 50 are tightened, as discussed below. When the collars are loosened, the resilient nature of the material from which the plug portions are preferably molded or manufactured urges the release of the pressure so exerted. Annular shoulder 45 of sleeve 40 restricts the axial movement of tube 20 past the center of sleeve 40. Compressible plug portions 41 and 42 are basically cylindrical in shape with the walls varying in thickness from a minimum near the middle of sleeve 40 to a maximum at the outer ends. The internal bores 46 and 47 are of an essentially constant diameter while the outer surfaces are flared forming longitudinal camming surfaces 48 and 49.

Collars 30 and 50 are cylindrically shaped having internal bores 33 and 53, respectively, that are flared in a similar and cooperating manner to outer surfaces 48 and 49 of plug portions 41 and 42. When locking mechanism 10 is assembled the inner radial edges, as viewed in the drawings, of collars 30 and 50 interface with each other. Disposed on these interfacing inner edges are circumferentially disposed and rotationally actuated cam surfaces 31 and 32, and 51 and 52, respectively. Each of these surfaces have an arc length of about half a full circle and are cut at a depth and angle sufficient to permit the required cam action tightening of the device, as discussed below. In this regard the depth and angle of these circumferential cam surfaces are directly proportioned to the mechanical leverage that is to be attained by their interaction, i.e. the greater the depth and angle, the greater the leverage and vice-versa.

Collars 30 and 50 fit over compressible plugs 41 and 42, respectively, as best shown in FIG. 3. Locking mechanism 10 is tightened or loosened by the rotational movement of collars 30 and 50 in opposite directions relative to each other. When the collars are rotated one way, cam surface 31 slides along cam surface 51, and in a similar manner surface 32 slides along surface 52. The camming action resulting from the relative movement of these surfaces causes collars 30 and 50 to move axially outward from the middle or sleeve 40. The outward movement of the collars causes the longitudinal cam surfaces 33 and 53 to slide outwardly along surfaces 48 and 49, respectively. The interaction of the longitudinal camming surfaces induces the internal bores 46 and 47 of the compressible plug portions 41 and 42 to compress on tubes 20 and 21, respectively. The flared angular shape of longitudinal cam surfaces 48 and 49, and 33 and 53 also permits the locking mechanism 10 to be maintained in assembled form when not in use due to the fact that assembling or disassembling the mechanism requires the operator to forcefully fit collars 30 and 50 over compressible plug portions 41 and 42 by manually compressing the latter. In operation, the operator would normally rotate the collars until the tubes were locked into such position that they could not be axially or rotationally moved with reasonable manual force. The coordinated action of the circumferential and longitudinal cams generally provides enough mechanical leverage to permit sufficient tightening to be accomplished with less than one-half, and generally only about one-third of a turn of the collars relative to each other. Using the device as described permits the operator to releasably lock the tubes in any telescoping position.

Similarly, when it is desired to slide tube 21 into or out of tube 20, collars 30 and 50 are rotated in the direction opposite from that with which the mechanism was tightened. Such rotational movement causes the collars to move axially toward each other due to the opposite camming action of surface 31 against surface 51, and cam surface 32 against surface 52. The axial movement of the collars toward one another causes longitudinal cam surface 33 to slide axially to the right, as depicted in the drawings, along cam surface 48 and, similarly, causes cam surface 53 to slide axially to the left along cam surface 49. Movement of these longitudinal cam surfaces in this manner releases the pressure exerted on compressible plug portions 41 and 42 and thereby releases the pressure exerted on the tubes.

An alternative preferred embodiment of the invention is illustrated in FIGS. 5 to 7, inclusively. In this embodiment, collar 60 is molded intricately into one piece with compressible plug portion 63. Collar 60 is fixedly attached to outer tube 20 by any conventional means such as gluing or crimping the internal bore 66 of the collar 60 with the outer surface of tube 20. Axial movement of the outer tube 20 is further restricted by annular shoulder 67 of the collar 60. Compressible plug portion 63 of collar 60 includes a plurality of slots 64 that permit the compression and expansion of plug portion 63 when the camming action to be described is implemented. Collar 50 fits over plug portion 63 as best illustrated in FIG. 5. Rotation of collar 50 relative to collar 60 causes the collars to move axially toward or away from each other by the interaction of the camming surfaces 51 and 61, and 52 and 62, respectively. As the collars move away from each other, camming surfaces 53 and 65 cam against one another and cause the extended plug portion 63 to compress. Compression of plug portion 63 causes internal bore 68 to press against tube 21. One-half to about one-third of a turn of the collars relative to one another is generally required to lock the tubes in position. Tube 21 can be loosened and withdrawn from tube 20 by the rotational movement of the collars relative to each other in the opposite direction.

While a preferred and a modified form and embodiment of the invention has been illustrated and disclosed, other forms, as well as changes and improvements therein and thereon will occur to those skilled in the art who come to know and understand this invention, all without departing from the essence and substance thereof. Therefore, this patent is not to be restricted to only that which is specifically disclosed herein, or in any manner inconsistent with the progress by which this invention has promoted the progress of the art.

What is claimed is:

1. A multiple cam action locking mechanism for telescoping tubes comprising a compressible plug portion with a longitudinal cam surface disposed on the outer surface thereof, means for fixedly attaching said compressible plug portion to an end of the outer telescoping tube, said means including an inner radial edge and a circumferentially disposed rotationally actuated camming surface disposed on said radial edge, said compressible plug portion being adapted to slidably receive the inner telescoping tube, a collar adapted to fit over said compressible plug portion, said collar including an inner longitudinal camming surface that is slidable against the longitudinal camming surface of said compressible plug portion and an inner radial edge with a circumferentially disposed rotationally actuated camming surface disposed thereon, said last named camming surface being adapted to slide against the circumferentially disposed rotationally actuated camming surface of said first named means.

2. The locking mechanism of claim 1 wherein said compressible plug portion is formed integrally with a sleeve and said means includes a second compressible plug portion opposite said first named plug portion formed integrally with said sleeve and a second collar adapted to fit over said second compressible plug portion, said second collar including an inner radial edge and a circumferentially disposed rotationally actuated camming surface disposed on said radial edge, said sleeve being mountable on an end of the outer telescoping tube and being adapted to slidably receive the inner telescoping tube.

3. The locking mechanism of claims 1 or 2 wherein duplicate, circumferentially disposed, rotationally actuated camming surfaces are disposed on said inner radial edges.

4. The locking mechanism of claim 1 wherein said compressible plug portion is cylindrically shaped and includes a plurality of axial slots to permit said plug portion to flex and exert releasable compressive pressure on the inner telescoping tube when the mechanism is tightened.

5. The locking mechanism of claims 2 or 3 wherein the compressible plug portions are cylindrically shaped and include a plurality of axial slots to permit said plug portions to flex and exert releasable compressive pressure on the telescoping tubes when the mechanism is tightened.

6. The locking mechanism of claims 1 or 4 wherein said first named means includes an annular shoulder to limit the axial movement of the outer telescoping tube and the outer surface of the compressible plug portion is axially flared and the inner surface of the collar is axially flared in a similar and cooperating manner to said outer surface of said plug portion.

7. The locking mechanism of claims 2, 3 or 5 wherein an annular shoulder is disposed within said sleeve to limit the movement of the outer telescoping tube.

8. The locking mechanism of claims 2, 3, 5 or 7 wherein the outer surfaces of the compressible plug portions are axially flared and the inner surfaces of the collars are axially flared in a similar and cooperating manner to said outer surfaces of said plug portions.

9. The locking mechanism of any of the foregoing claims wherein said locking mechanism is made of a plastic material.

10. The locking mechanism of any of the foregoing claims in combination with an extension pole for use with a paint applicator.

* * * * *